United States Patent
Eldic

(10) Patent No.: US 9,989,621 B2
(45) Date of Patent: *Jun. 5, 2018

(54) REACTIVE HYBRID LOCATION DETERMINATION METHOD AND APPARATUS

(71) Applicant: Bluedot Innovation Pty Ltd, East Melbourne, Victoria (AU)

(72) Inventor: Filip Eldic, Richmond (AU)

(73) Assignee: Bluedot Innovation Pty Ltd, East Melbourne (AU)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/379,269

(22) Filed: Dec. 14, 2016

(65) Prior Publication Data

US 2017/0090008 A1  Mar. 30, 2017

Related U.S. Application Data

(63) Continuation of application No. 14/885,940, filed on Oct. 16, 2015, now Pat. No. 9,557,403, which is a
(Continued)

(30) Foreign Application Priority Data

Apr. 18, 2013  (AU) ................................ 2013901369

(51) Int. Cl.
*H04W 24/00* (2009.01)
*G01S 5/02* (2010.01)
(Continued)

(52) U.S. Cl.
CPC .......... *G01S 5/0263* (2013.01); *G01S 5/0284* (2013.01); *G01S 19/34* (2013.01); *G01S 19/51* (2013.01);
(Continued)

(58) Field of Classification Search
CPC ...... G01S 5/0263; G01S 5/0284; G01S 19/51; H04B 17/27; H04W 4/027; H04W 64/00
(Continued)

(56) References Cited

U.S. PATENT DOCUMENTS 8,036,679 B1   10/2011  Barbeau et al.
9,557,403 B2 *  1/2017  Eldic ..................... H04B 17/27
(Continued)

FOREIGN PATENT DOCUMENTS

CN    102938927    2/2013
EP    2790385      10/2014

OTHER PUBLICATIONS

PCT International Search Report, PCT Application No. PCT/AU2014/000446, dated Jul. 9, 2014, 5 pages.
(Continued)

*Primary Examiner* — Ayodeji Ayotunde
(74) *Attorney, Agent, or Firm* — Fenwick & West LLP

(57) ABSTRACT

A method is described of using the mobile device so as to control the drain of power from the power source of the mobile device, the mobile device having at least two location determination techniques having respective power drain characteristics, the method includes selecting the location determination technique having a lower power drain characteristic the greater the determined distance of the mobile device from a predetermined location or area, and selecting the location determination technique having the greater power drain characteristic the smaller the determined distance of the mobile device from a predetermined location or area. The method thus uses the least accurate technique when furthest away and the most accurate technique when closer to a predetermined location or area.

20 Claims, 13 Drawing Sheets

Related U.S. Application Data continuation of application No. PCT/AU2014/000446, filed on Apr. 22, 2014.

(51) Int. Cl.

| | | |
|---|---|---|
| *H04W 64/00* | (2009.01) | |
| *H04B 17/27* | (2015.01) | |
| *G01S 19/34* | (2010.01) | |
| *G01S 19/51* | (2010.01) | |
| *H04W 52/02* | (2009.01) | |
| *H04W 4/02* | (2018.01) | |
| *H04M 3/42* | (2006.01) | |
| *G01S 11/02* | (2010.01) | |

(52) U.S. Cl.
CPC ............ *H04B 17/27* (2015.01); *H04W 4/027* (2013.01); *H04W 52/0209* (2013.01); *H04W 64/00* (2013.01); *G01S 11/02* (2013.01); *Y02D 70/00* (2018.01); *Y02D 70/1222* (2018.01); *Y02D 70/142* (2018.01); *Y02D 70/144* (2018.01); *Y02D 70/164* (2018.01)

(58) Field of Classification Search
USPC .............................. 342/458; 455/414.2, 456.1
See application file for complete search history.

(56) References Cited

U.S. PATENT DOCUMENTS

| | | |
|---|---|---|
| 2005/0136845 A1 | 6/2005 | Masuoka et al. |
| 2007/0093257 A1 | 4/2007 | McDougall et al. |
| 2007/0287473 A1 | 12/2007 | Dupray |
| 2008/0287139 A1 | 11/2008 | Carlson et al. |
| 2013/0017840 A1 | 1/2013 | Moeglein et al. |
| 2013/0035112 A1 | 2/2013 | Takahashi |
| 2013/0093627 A1 | 4/2013 | Cosman |
| 2014/0221000 A1* | 8/2014 | Roberts ................. H04W 16/14 455/454 |

OTHER PUBLICATIONS

PCT Written Opinion, PCT Application No. PCT/AU2014/000446, dated Jul. 9, 2014, 4 pages.
European Extended Search Report, European Application No. 14786084.5, dated Nov. 4, 2016, 12 pages.
Bareth, U. et al., "Energy-Efficient Position Tracking in Proactive Location-Based Services for Smartphone Environments," 2011 35.sup.th IEEE Annual Computer Software and Applications Conference (COMPSAC), IEEE, Jul. 18, 2011, pp. 516-521.
United States Office Action, U.S. Appl. No. 14/885,940, dated Jul. 29, 2016, 10 pages.
United States Office Action, U.S. Appl. No. 14/885,940, dated Feb. 2, 2016, 16 pages.

* cited by examiner

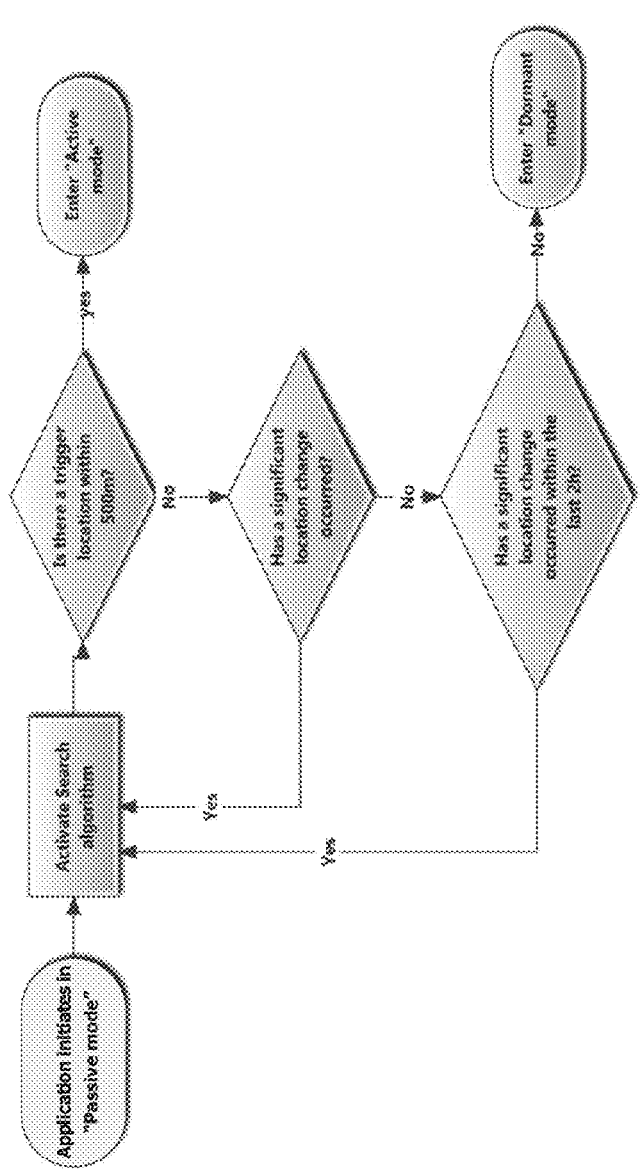
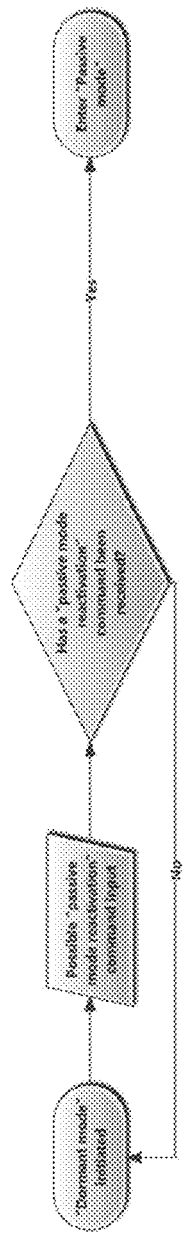
*Figure 9*
*Figure 10*

REACTIVE HYBRID LOCATION DETERMINATION METHOD AND APPARATUS

CROSS-REFERENCE TO RELATED APPLICATIONS

This application is a continuation application of U.S. patent application Ser. No. 14/885,940, filed Oct. 16, 2015, which is a continuation application of international application PCT/AU2014/000446, filed Apr. 22, 2014, which claims the benefit of Australian provisional application 2013901369, filed on Apr. 18, 2013. Both applications are incorporated by reference herein in their entirety.

TECHNICAL FIELD

The embodiments relate to location determination technology useable by, in particular, cellular telephone devices having mobile computer capabilities and a self-contained battery supply.

BACKGROUND

Designers and users of mobile based software applications that use location based services would like to ensure location accuracy when entering a predetermined area or at or near a predetermined location, while avoiding or minimising constant battery drain as a result of location determination methods, such as GPS, which are always ON so they can supply the current location of the device regardless of their location, which for the majority of the time is not in, near or at the predetermined area or location.

SUMMARY

According to a broad aspect, there is provided a method in a mobile computer device of using one of a plurality of location determination functions depending on the determined location with respect to a predetermined location by including in that determination the known error of the used location determination function, the method being such that the closer or further the determined location is to the predetermined location the location determination function used has respectively a greater or lesser known error of determination.

In a further aspect of the embodiments, the estimated or determined power requirement during operation of the respective location determination functions is adapted to be less for those location determination functions having the greater known error of determination.

It yet a further aspect of the embodiments, there is a method to determine the location of a device which is capable of using two or more of the available location determination techniques available to the device with their respective accuracy of determination for determining the distance of the device from a predetermined location or area, wherein the method includes the following steps:

determining the location of the device using a location determination technique usable by the device, wherein the location determination technique has a respective accuracy of determination;

determining the distance from the location or area, determining whether to use a further distance determining technique and the respective accuracy of that further distance determination technique dependent on whether the determined distance is greater than or less than a predetermined distance, wherein the accuracy of the last used location determination technique is at the highest accuracy for the shorter determined distances and lesser accuracy is used for the longer distances.

In a further aspect of the embodiments the step of determining the travel speed of the device by one or more of the group of functions: extrapolating the speed of a device from the last two established locations determined using a location determination technique usable by the device and the time the last two locations are established; by directly establishing the device travel speed of the device as reported by location determination method of utilising the GPS chipset that reports current travel speed as a part of its regular functionality; a speed determination provided by an external source.

In yet a further aspect of the embodiments the step of determining or having a predetermined error of location determination for each location determination technique, where the error of the technique is adjusted according to the frequency of location determination.

Yet further, wherein each use of a technique requiring a greater accuracy of the location determination occurs when the distance of the device from the predetermined area or location is less than the predetermined distance being the predetermined error expressed as a distance of the particular location determination technique being used plus a predetermined marginal distance.

Yet further each use of a technique of decreasing accuracy of position determination occurs when the distance of the device from the predetermined geographic area or location is greater than the predetermined distance being the predetermined error expressed as a distance of the particular location determination technique being used plus a predetermined marginal distance.

In yet a further aspect of the embodiments the step of determining the location of the device using a location determination technique usable by the device uses a predetermined error for the location determination technique according to the travel speed of the device.

In yet a further broad aspect of the embodiments a method of using a mobile device to control the drain of power from the power source of the mobile device, the mobile device having at least 2 location determination techniques having respective power drain characteristics, the method in includes selecting the location determination technique having the greatest power drain characteristics the smaller the determined distance of the mobile device from a predetermined location or area.

Details concerning computers, computer networking, software programming, telecommunications and the like may at times not be specifically illustrated, as such were not considered necessary to obtain a complete understanding nor to limit a person skilled in the art in performing the embodiments, are considered present nevertheless as such are considered to be within the skills of persons of ordinary skill in the art.

A detailed description of one or more embodiments is provided below along with accompanying figures that illustrate, by way of example, the principles of the embodiments. The scope of the embodiments is limited only by the appended claims and the embodiments encompass numerous alternatives, modifications, and equivalents. For the purpose of example, numerous specific details are set forth in the following description in order to provide a thorough understanding of the present embodiments. The present embodiments may be practiced according to the claims without some or all of these specific details. For the purpose of clarity, technical material that is known in the technical fields related to the embodiments has not been described in detail so that the present embodiments are not unnecessarily obscured.

Although the foregoing embodiments have been described in some detail for purposes of clarity of understanding, it will be apparent that certain changes and modifications may be practiced within the scope of the appended claims. It should be noted, that there are many alternative ways of implementing both the process and apparatus of the present embodiments.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The reference to any background or prior art in this specification is not, and should not be taken as, an acknowledgment or any form of suggestion that such background or prior art forms part of the common general knowledge.

"Software," as used herein, includes but is not limited to one or more computer readable and/or executable instructions that cause a computer or other electronic device to perform functions, actions, and/or behave in a desired manner. The instructions may be embodied in various forms such as routines, algorithms, modules, or programs including separate applications or code from dynamically linked libraries. Software may also be implemented in various forms such as a stand-alone program, a function call, a servlet, an applet, and an application, instructions stored in a memory, part of an operating system or other type of executable instructions. It will be appreciated by one of ordinary skilled in the art that the form of software is dependent on, for example, requirements of a desired application, the environment it runs on, and/or the desires of a designer/programmer or the like.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

BRIEF DESCRIPTION OF DRAWINGS

Embodiments will be discussed with reference to the accompanying drawings wherein:

FIG. 9 depicts a flow diagram of the steps associated with the performance by the application to initiate a "passive mode"; and FIG. 10 depicts a flow diagram of the steps associated with being in the dormant mode and possible passive mode reactivation.

In the following description, like reference characters designate like or corresponding parts throughout the figures.

DETAILED DESCRIPTION

Figure 1:
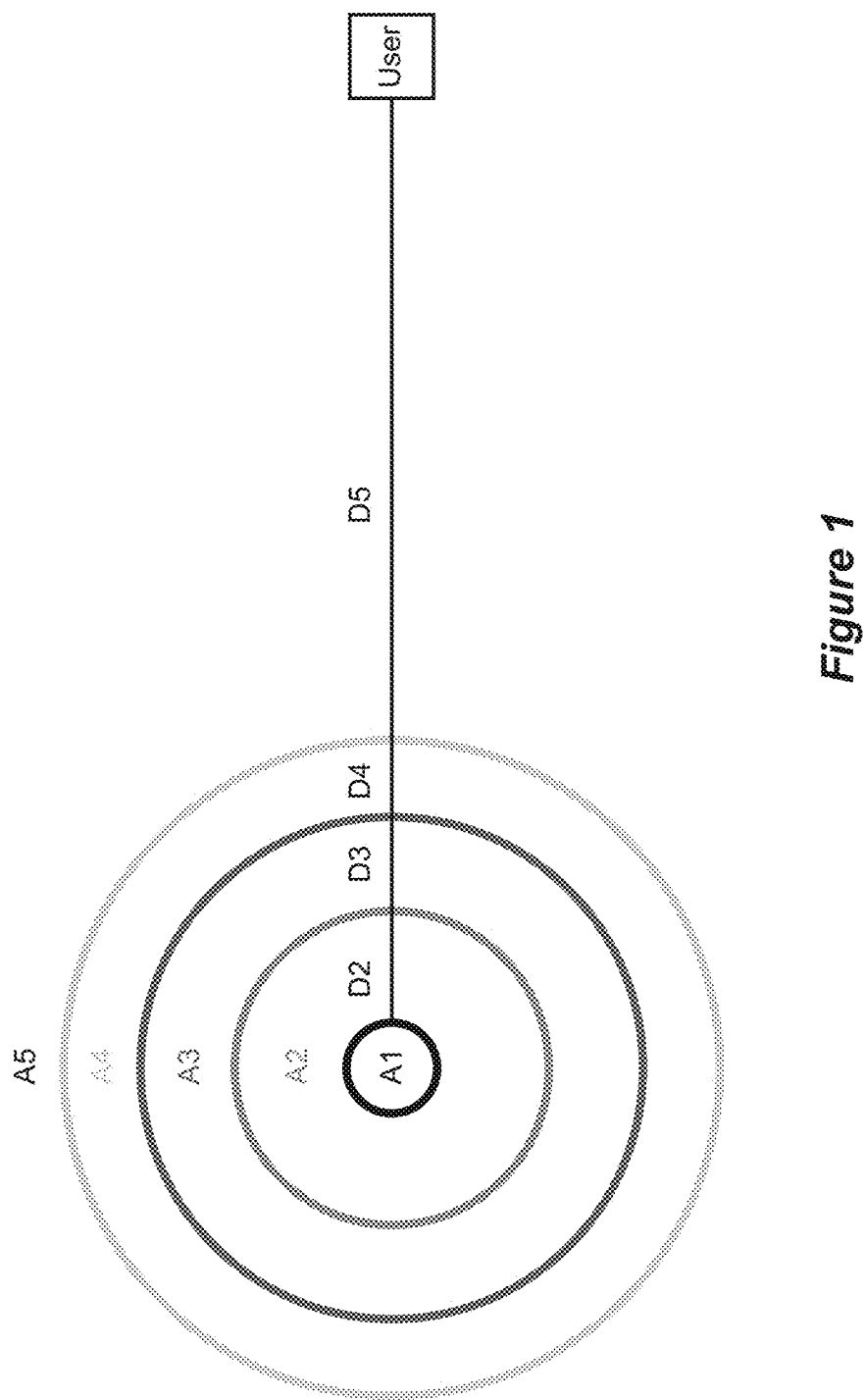
FIG. 1 is an array of geographic areas.
Figure 2A:
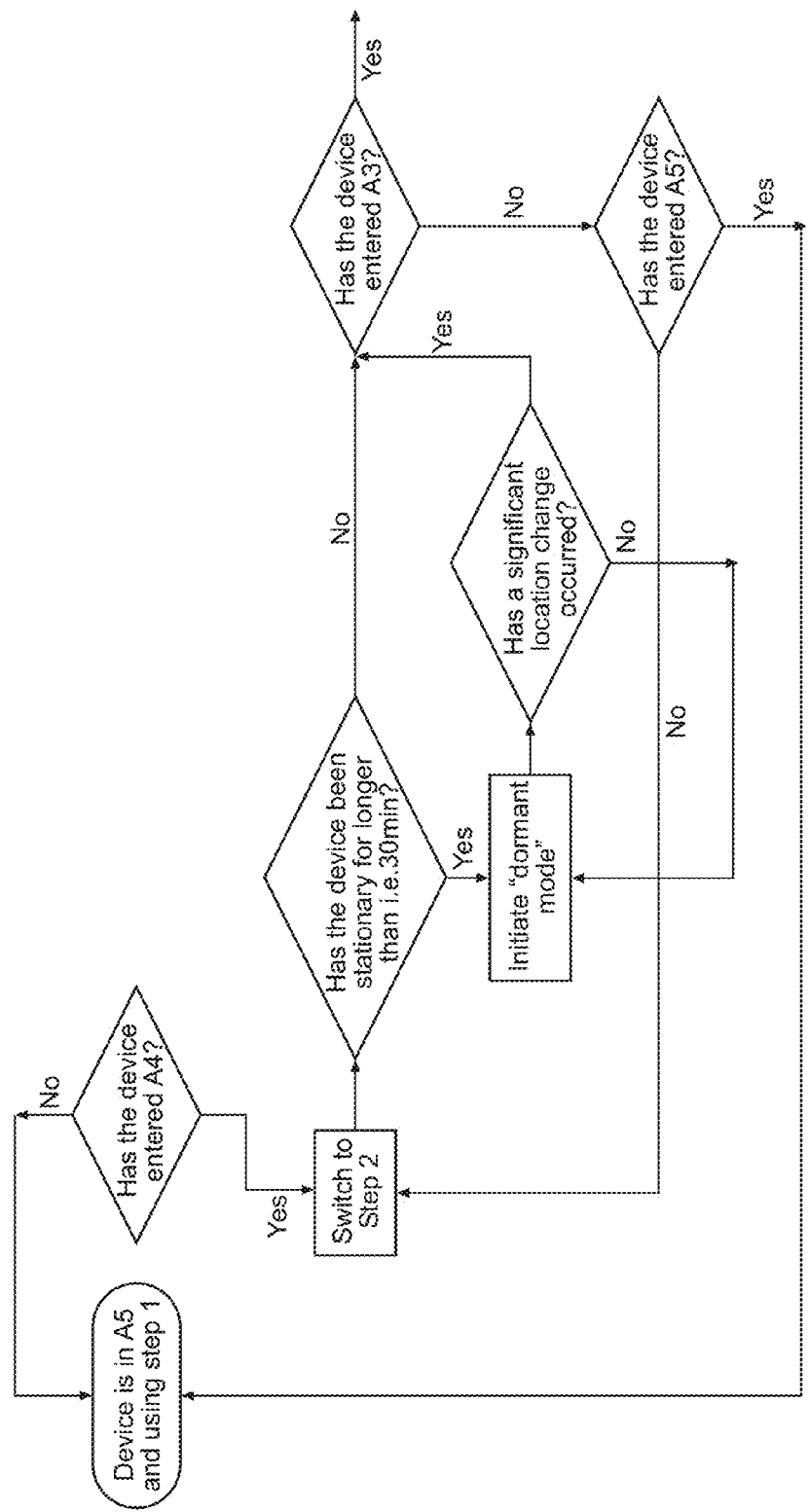
FIGS. 2A, 2B, and 2C depicts a flow diagram of a method.
Figure 2B:
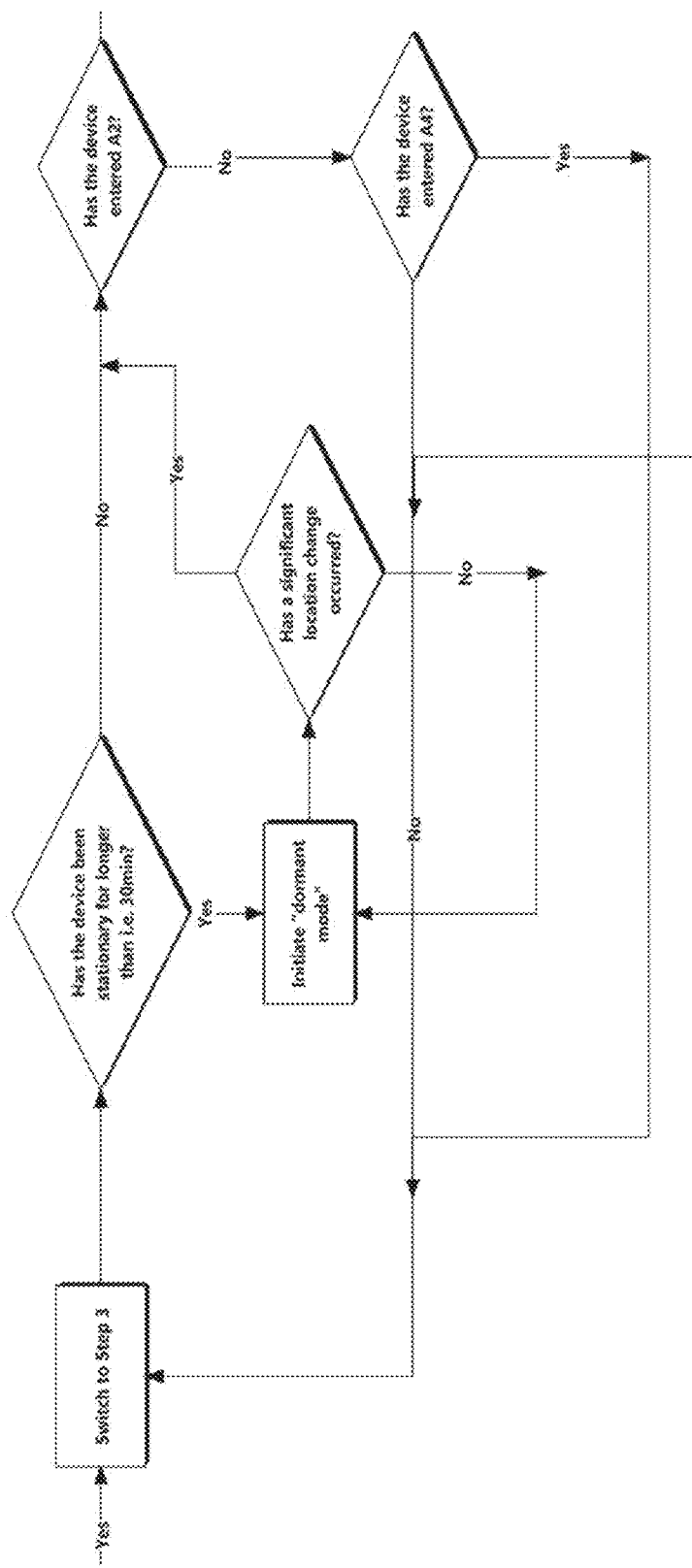
Figure 2C:
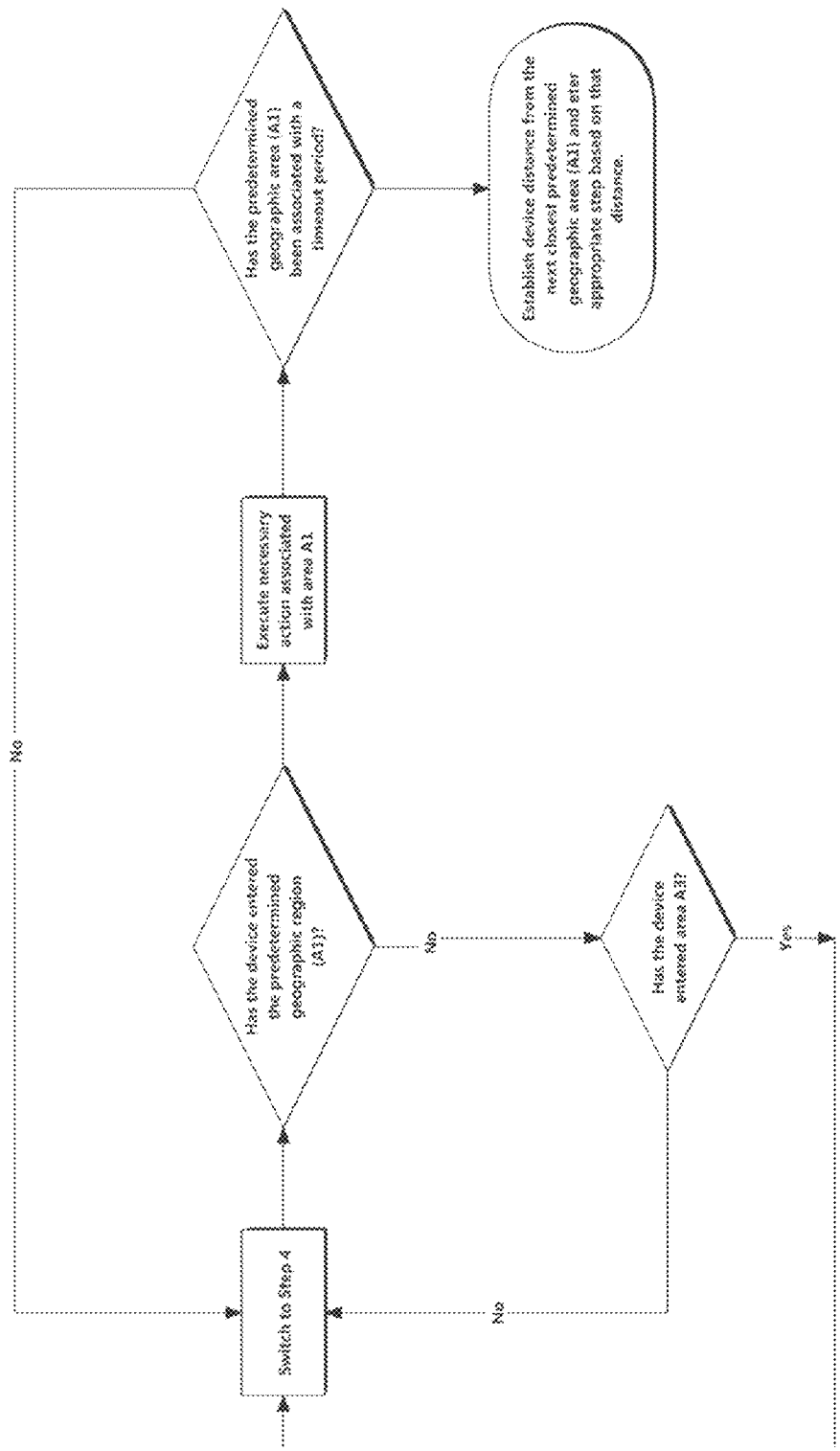

The methods described in this specification are referred to herein as a "Reactive Hybrid Location Determination technology" (RHLD technology) because the location determination method uses one or more of the available location determination techniques available to the device with their respective accuracy of determinations based on the determined distance from a predetermined location or area, wherein the highest accuracy is used closer to the predetermined location or area and the lesser accuracy is used further away, and consequently there is more and less power used in the location determination process respectively. The consequences of that being that the available battery capacity is used mostly when the importance of location accuracy is needed and not when it is not needed which is when it is further away from a predetermined area or location.

When referring to a device having location determination techniques and associated hardware it would be typical that the device is a smartphone (this term is often used in this specification). However, any device having a self-contained power supply and at least two location determination techniques available to it with their applicable predetermined accuracies is intended to be covered, so that by way of example, the device may be dedicated to a transportable container, the device may be part of a vehicle, the device may be part of a machine, the device may be connectable to the above or may be a small part of a larger arrangement.

In one embodiment, the method uses exiting capabilities within smart phones or other devices in order to determine a devices' location with respect to its location from a predetermined location or geographical area. It may be that there is more than one location determination application/device in the smart phone and each one, is used in turn or a combination of them is used to determine the location, wherein the associated known error of determination of each technique is used such that the most accurate location determination technique is used or a calculated combination of those errors is used.

The determination of the distance a mobile device is away from a location or area is performed as a consequence of the device first doing a location determination using one of the available location determination techniques then the device calculating the distance between them and thus the distance away the mobile device is from the predetermined location or area.

The determination of the location of the device relies on the use of a location determination technique usable by the device, wherein the location determination technique has a respective accuracy of determination. The device knows its location but only within the accuracy of the location determination. Based on a calculated distance from the location or area accounting for the associated error of the determination technique used to determine the location, it is then possible to determine whether to use a further distance determining technique and the respective accuracy of that further distance determination technique dependent on whether the determined distance is greater than or less than a predetermined distance, wherein the accuracy of the last used location determination technique is at the highest accuracy for the shorter determined distances and lesser accuracy is used for the longer distances.

The various location determination techniques are available to a device but each of them has different known accuracies. For example, GPS can have accuracy down to meters, in another example, WiFi based determination accuracy can be dependent on the signal strength at the time of the determination as well as other factors and may range from meters to tens of meters. The accuracy figure used can be conservative or mid-range or at an extreme but as long as there is consistency of usage of the known accuracy criteria the method of the embodiments herein can be used.

The technologies used for location determination of a device may include, the Global Positioning System (GPS), sector (telephony base station) position determination using for example IposDet (on CDMA networks), cellular tower (Cell ID) and Wi-Fi (802.11) access points which rely on the transmission of unique identifiers and related known location data to permit the triangulation of the receiving device. The use of hybrid technologies such as these can, by themselves, allow for position determination despite the occasional unreliability of one or more of them in different environmental and physical locations of the device.

It is a further application of the available features of a smart phone or other device that the location determination is associated with a certain action that the device is to perform as a result of the presence of the mobile device at a predetermined location or within an area about the predetermined location.

The manner in which a device provides location can depend on the technology that is used to derive that location. There are numerous technologies for position determination and associated with each technique there will be specific details of their accuracy. A location is generally expressed using the WGS (world geodetic system) 84 standard. This is used as a basis for expressing locations within GPS and all common smartphone platforms. Some location determination quantification standards exist that do not fall under WGS 84 such as ED50, ETRS89, GRS 80, NAD 83, DAVD88, SAD69, SRID and UTM. The use of a standard ensures that all manufacturers that design GPS devices and that use the output from such devices can readily generate GPS data that will be accepted by users of that GPS data to add value to the location determinations provided. As for all real world systems there is error which needs to be accounted for and accuracy is affected. By way of explanation without providing more of the relevant details, GPS error analysis examines the sources of errors in GPS results and the expected size of those errors. GPS makes corrections for receiver clock errors and other effects but there are still residual errors which are not always corrected. Sources of error include signal arrival time measurements, numerical calculations, atmospheric effects, ephemeris and clock data, multipath signals, and natural and artificial interference. The magnitude of the residual errors resulting from these sources is dependent on geometric dilution of precision. Thus when the term "location determination" is used the actual manner in which a location is presented is wholly dependent on the location determination technique used to determine that location and that there will be a known accuracy of determination which itself may be dependent on the application of the respective technique to the circumstances of the determination and which may be applicable to the determination only at the time of the determination and updated with future determinations. For example, a GPS location determination can have a range of accuracies, mostly dependent on the number of satellites that are available from which to derive the location complicated by one or more of the errors noted above. In the application of the method described in this specification there is in one embodiment use of a predetermined accuracy of location determination associated with each location determination technique available to the device and that accuracy is expressible as a distance so that it can be used in the process of determining when to change the technique of location determination. It may be that the predetermined accuracy of the location can be different for the same technique dependent on other measurable or known criteria, so that in a particular known location, such as in dense built-up areas the accuracy is known to be less and then the predetermined accuracy used by the same technique is an adjusted value, expressed as a distance.

In one embodiment, a predetermined marginal distance is applied when a location determination is made, this is done when, in particular, the determined location is close to the distance which represents the accuracy of the location determination technique being used at the time. Thus, by way of example, if the location determination technique has an accuracy when converted to a distance of +/−300 meters, then when a location determination is made that indicates that the device is 300 meters from a predetermined location or area, there is a chance that the device is actually already at the predetermined location or area because the location determination could be out by the 300 meters due to the inaccuracy. If this were sometimes the case then the benefit of changing to a more accurate location determination technique may not be presented to the device. Therefore, in a preferred arrangement, a marginal distance is applied to the process of selecting and then using a greater accuracy location determination technique. Thus by way of example, a marginal distance of 50 meters is added so as to create an adjusted determined distance (i.e. by using the current location determination technique and calculating the distance the device is from the predetermined location or area) before the selection of a more accurate (in this example) location determination technique and then use of that technique. Thus, when a device determines that it is located about 350 meters for the predetermined location or area, it will change the location determination technique to a more accurate technique. The use of a marginal distance ensures the benefits of changing the location determination to the most accurate location determination technique are provided to the mobile device and hence the benefits of draining less power from the finite source of power associated with the mobile device, typically a battery.

It is a matter of design choice as to whether the higher accuracy technique is continued to be used for some time even though the device may then determine that it is still in some cases greater than the 300 meters away the predetermined location or area. In one example, the current location determination technique is used multiple times to ensure that the determined distance is about the 350 meters or less for each determination and the selection of a different location determination technique only takes place when a predetermined number of determinations are made so as to establish that the mobile device is within a predetermined distance from the predetermined location or area. By way of another example, if more than two location determinations (when calculated to a distance from the predetermined location or area) indicate that the device is getting closer to the predetermined location or area, then it will continue to use the more accurate location determination technique. In another alternative, there is a predetermined period of time that the higher accuracy location determination technique is used for despite the movement of the device further away or closer to the predetermined location or area, this later approach allowing for the device taking a circuitous route to the predetermined location or area in the region where a changeover of techniques may have been triggered. The examples provided are but some of the workable arrangements for dealing with the circumstances described and which although not always providing for a lessening of the power drain do address some situations that are not clear cut as to whether a particular distance range has been entered or not.

These and other requirements are described at a high level of abstraction but are all readily coded by those of skill in the art to implement them in the software of the device.

By way of example, the predetermined accuracies of each available location determination technique can be preprogrammed into a Look-Up-Table resident in the memory of the mobile device and from which they can be read and temporally stored for use when making a calculation.

In one embodiment, the RHLD technology functions by determining the devices' distance from a predetermined geographic area (A1) (refer to FIG. 1) associated with which is a certain action to be performed by the device. The location determination can be set to be done at predetermined intervals of time and the determination can use one of a plurality of location determination functions the use of which depend on the determined location with respect to a predetermined location including, in that determination, the known error of the used location determination function and optionally a marginal distance, the method being such that the closer or further the determined location is to the predetermined location the location determination function used has respectively a greater or lesser known error of determination.

The device can constantly establish the current travel speed of the device by either recording the two last known locations of the device along with the time that each location has been established and extrapolating its travel speed or establishing its current travel speed from direct internal instrument readings of travel speed such as those readings reported by GPS and other location determination mechanisms and chipsets having various measurement techniques and inputs such as for example direct input from the vehicle. Vehicle derived location can be achieved using Car2Car information exchange and the concurrent use of beacons and other location providing devices. Inherent with the use of the location determination technique is the accuracy of the technique in the circumstances of its use.

When a device is in a situation of decreasing distance relative to the predetermined geographic area but the distance of the device from a predetermined distance from that geographic area or location is less than the predetermined area plus a margin because the error of the location determination technique is such that although the device may actually be at or further away than the predetermined distance it does not know better because of the stated accuracy/inaccuracy. The device can then determine that is it best to change to a more accurate location determination technique.

In certain circumstances the associated error can be adjusted for the travel speed of the device. For example, if the accuracy is poor (i.e. the possible error of location determination is plus and minus a large distance variation) while approaching a predetermined distance from a geographic area or locations, but the speed of movement is large, then the need to change to a more accurate location determination technique is more pressing, however, if the speed of movement is low, then there is less need to change to a more accurate location determination technique is less pressing. In another approach the device can continuously monitor the error/accuracy of a particular location determination technique where and then adjust the error such that the error increases according to a predetermined proportionality as the travel speed of the device increases and similarly the error decreases according to a predetermined proportionality as the travel speed of the device decreases.

The predetermined location can be a point (such as a latitude and longitude pair) or can be an area defined by a boundary formed by a collection of latitude and longitude pairs. This being a two-dimensional approach but the technique is equally applicable to 3-d location determination, indeed the GPS uses 3-d location determination but most users assume it is only a 2-d system.

The device will increase its location determination accuracy through the use of a combination of location services that are scaled in their ratio of accuracy to battery drain with higher accuracy used the closer the device is to a predetermined area (the 2-d example) (A1) and consequently higher battery drain as the complexity of the location determination increases or the time to increase accuracy increases.

In one embodiment, each step of increasing accuracy is to occur when the distance of the device from the predetermined area (A1) is equal to or greater to the established error of the particular technique being used at any particular time and each step of decreasing position is to occur when the distance of the device from the predetermined geographic area (A1) is higher plus a marginal distance than the standard error of the location determination technique associated with the step utilizing less accuracy.

In one embodiment, each step in the method of determining the location is undertaken with one, but it could be two simultaneous techniques, or two techniques, which work in collaboration with one another, in which cases there is a combination of the accuracy of the determination. The combination may be an arithmetic approach or according to a determined function.

Further, the method in one embodiment includes an increase in the interval frequency of determining the location of the device as the device gets closer to the predetermined area or location with the frequency of determination to be predetermined or as determined on the basis of one or more characteristics, such as the distance from the predetermined area or location, or the nearest to a boundary or intended change-over of the technique, or the speed of travel, etc.

By utilizing the method/s outlined in this document, the designers and users of mobile based software applications that focus on location based services can ensure the necessary location determination accuracy when entering a geographic area or approaching a predetermined location, associated with a certain action of the application while eliminating constant battery drain or reducing battery drain compared to prior continuous location determination methods.

There also the method of using a mobile device to control the drain of power from the power source of the mobile device. The mobile device has at least 2 location determination techniques each having a respective power drain characteristic. The method in includes selecting the location determination technique having the greatest power drain characteristics the smaller the determined distance of the mobile device from a predetermined location area.

This method and the other methods of the embodiments assume that the location determination technique used by the mobile device has a direct correlation with power drain characteristics. The relationship being that the more accurate the location determination technique the more power is drained from the power source and that the less accurate the location determination technique the less power is drained from the power source. This assumption has been tested and is confirmed as substantially correct.

Referring to FIG. 1, which displays the boundaries of various areas about a predetermined area (A1), which could equally be a predetermined 3-d volume or 3-d or 2-d location, the areas are for simplicity, shown as annular areas of greater diameter/radius, because the definition of these areas is based on circular areas. It is completely up to the users of the location determination, as to whether the areas are of the illustrated shape or are of some other regular shape or even an irregular shape and the manner in which those areas are defined is both a mathematical and environmental challenge but in any event, completely deterministic within the accuracy of the determination, hence the need to be cognizant of the accuracy of the determination technique.

FIG. 1 depicts successively greater diameter areas (A2), (A3), (A4), and (A5) which have successively greater diameters/radii. In comparing the location determined distance from an area or position, it is a simple matter to compare the radii with each determined distance, plus or minus the error of the position and hence the distance determination.

In order for the technology to function, several technological prerequisites are preferable.

In one embodiment, the functionality of the location determination requires the use of a smart phone, but it is completely dependent on the needs of the user of the method/s disclosed herein to use other devices that have the capability of location determination.

A specific smart phone or other device will have in one embodiment the capability of determining its location, subject to accuracy allowances, using inbuilt hardware and software and in one example the inbuilt Global Positioning System device and software.

The specific smart phone or other device will have in one embodiment the capability of determining its location, subject to accuracy allowances, using the technique of cell tower triangulation, if the device has cellular telecommunications capability.

The specific smart phone or other device will also have in one embodiment the capability of determining its location, subject to accuracy allowances, using the technique of Wi-Fi positioning.

The specific smart phone or other device will also have in one embodiment the capability of determining its location, subject to accuracy allowances, using the technique of Bluetooth positioning.

The specific smart phone or other device will also have in one embodiment the capability of determining its location, subject to accuracy allowances, using the technique of inertial navigation.

The specific smart phone or other device will also have in one embodiment the capability of utilizing all of the above techniques and technologies in a cooperative hybrid methodology, such as in the example technique of Assisted-GPS location determination or any other technique that may become available.

Figure 3:
FIG. 3 depicts illustrations of the major elements of a smart phone.

FIG. 3 depicts the basic components of a typical smart phone including the phone housing 1 the user input element 2 being a combined display and touch sensitive input screen which guides the user to touch an icon or similar to initiate and action of the respective programme and simultaneously display information relevant to the application running at the time or show pop-up information relating to one or more functions of one or more other applications. The battery supplies power for the various functions of the smart phone. There is a central processing unit to perform the execution of the various applications, interaction with the SIM card 5, GSM antenna 6, GPS chipset 7 and Wi-Fi receiver 8 (and transmitter) and well as optional wireless communications using Bluetooth receiver 9 (and transmitter) as well as with the memory 10, which holds the various applications and data associated with the functioning of those applications and the program and various other data (including Look-Up Tables) of the methods of the embodiments.

The working of a typical smart phone is well known to those skilled in the art and the programming of an application to perform the method of the embodiments disclosed in this specification is also well known once the specific functions and limitations are taken note of from the description provided. The specific smart phone or other device (since a smart phone is but one example) will have in one embodiment the capability to determine its own location, subject to accuracy allowances, and the distance between its determined location and a predetermined geographic area or location that has been identified to the device by using the CPU, memory and one or more of the elements described as well as functions and applications that are available from the memory.

In one embodiment, the smart phone or device has a processor and associated memory adapted to execute an application or device specific program that allows for the combined usage of the mentioned location services, and which allows the device to communicate with a server. The server may in one embodiment be a back end Content Management System (CMS) and that allows for the storage and making available to the smart phone or device the predetermined geographical area or predetermined location and thus, is equipped to determine the distance of the smart phone or device from the predetermined area or location as it approaches the area or predetermined location. Such determination can be optional since the device is largely capable of performing that determination, but in some cases that determination may be exclusively performed by the server.

An embodiment of a backend has the ability for a user to determine a geographic area that is defined by a set of geographic coordinates, characterised in one example, as longitude and latitude (this area may be determined as either a central point surrounded by a radius, an area that is limited by lines connecting four geographical points, any polygonal area defined by any number of geographical coordinates and a number of line segments bounding the shape defined as lines between any numbers of longitude/latitude pairs that form a closed chain of lines or any combination of single or multiple areas as described previously). As discussed previously the geographic area is merely an embodiment and 3-d geographical area/zone/volume can just as easily be created. Noting that the separate floors of a multi-story building can be defined (geofenced) if required.

The backend will in one embodiment have a mechanism for the back end to communicate with the smart phone or other device and relay any new or existing predetermined geographic areas or locations.

In one embodiment, the backend has the ability to perform certain actions associated with a predetermined geographical area or location when the smart phone or device communicates to the back end that it has entered, is about to enter, and or is in or at the predetermined area or location or within one or more predetermined distances (or area potentially defined by one or more distances) from the predetermined area or location (allowing for the respective accuracy of the location determination technique used).

For a mobile communication device (e.g. smart phone or communications equipped device) to perform a particular function, the device needs to be able to determine its location or distance with respect to an area or location.

By incrementally increasing the location determination accuracy as it gets closer to such an area or location, the program executed by the device is able to minimize battery drain by only using battery draining location techniques, such as GPS, when absolutely needed. The steps the program will undertake to reach this predetermined geographic area or location are location determination techniques that, within any given distance from the area to the device, allow for the maximum error to apply (in most cases this is the predetermined error expressed as a distance) when using any particular technique.

As the device gets nearer to the area and the current location determination techniques accuracy error does not suffice to accurately determine whether the device is within the area, the program as executed, will switch the device to use another location determination technique that has a greater accuracy (this occurs when the distance from the device to the area or location is equal to or lower than the distance with the applied accuracy error for the technique being used plus a marginal distance). Otherwise as explained the device cannot be certain it has or has not reached the predetermined location or area.

Furthermore within the technique, the frequency of location determination can be dependent on a previous determined distance from the predetermined location or area.

The program will not determine its location constantly but rather at predefined time intervals dependent on which area it determines it is within or what distance it is from the predetermined area or location. If the device determines it is a great distance from a predetermined area or location, it will examine its location using the current technique with less frequency (i.e. at a greater time interval). As the determined distance reduces (i.e. it enters an area associated with a closer proximity to the predetermined area or location), the device will make the location and distance determination more frequently (i.e. at a lesser time interval) than previously, and there may be a distance at which the location determination and hence the distance determination technique is effectively doing so constantly. The technique of lessening the time interval between location and distance determination as the device becomes closer can vary form that described, such as for example, the time interval can vary as a function of the determined distance, the function being non-linear and weighted according to the capabilities of the device and the importance of the accuracy of the distance determination. Thus when the term frequency of location determination is used it can represent various time intervals between determinations depending on various factors as described or that are within the knowledge and skill of one in the art.

The following are various techniques of position determination along with their known battery drain characteristics:

The following numbers are illustrative only and the true figures may depend on many conditions, including but not limited to nor necessarily absolutely required to be accounted for: ambient environmental conditions; the number of cell towers in the vicinity of the device at the time; GPS signal coverage dependent on the number of satellites orbiting the area at a given time; the number of satellites being received; geographical spread and height of surrounding buildings (they create a canyon effect that does not allow GPS signals penetrate a certain area); multipath effects, etc.

Hybrid device location method without GPS (accuracy +/−500 m, battery drain light).

Hybrid device location method—Assisted GPS1 (accuracy +/−100 m, battery drain moderate). Note that Assisted GPS may be utilized with alternate accuracy requirements that in turn, affect battery drain more as the necessary accuracy increases.

Hybrid device location method—Assisted GPS2 (accuracy +/−30 m, battery drain moderate to heavy).

Hybrid device location method—Assisted GPS3 with highest GPS accuracy (accuracy +/−5 m, battery drain heavy).

An example of the incremental location determination steps is outlined below and corresponds to FIG. 1 and FIGS. 2A, 2B, and 2C.

It is important to realise that there may be more or less steps in any invocation of the principle described in this specification. Steps may be reduced or added as required for one or more reasons including the future improvements, such as location determination techniques and associated devices.

Step 1—Hybrid Device Location Method without GPS.

In step 1, the user's device is located a distance D5 from the predetermined geographical area (A1), in area (A5), such that the device uses the Hybrid device location method without GPS (accuracy up to 500 m, battery drain negligible) to determine its location with reference to the said area. Also the program determines its location at a predetermined time interval (eg every 90 seconds). The device uses this technique until it reaches a distance to the area at which it cannot be determined with certainty that the device is outside of the predetermined area (A5) and likely closer to the predetermined area A5. When a distance from the user's device to the area is established to be equal to or greater to the error of the cell tower triangulation method then the device will move to step 2 that allows for greater accuracy. There is also the option of adjusting for the travel speed of the device. The use of a marginal distance is also possible as described earlier. It is also possible to adjust for travel speed of the device towards or away from the predetermined area.

Step 2—Hybrid Device Location Method—Assisted GPS 1.

In step 2, the user's device is located a distance D4 from the predetermined geographical area (A1), in area (A4), such that the device uses the Hybrid device location method—Assisted GPS 1 (accuracy up to 100 m, battery drain moderate) to determine its location in reference to the area (A1). Also, the program determines the device location at a predetermined time interval shorter than in step 1 (eg every 20 seconds). The device uses this technique until it reaches a distance to the area at which it cannot be determined with certainty that the device is outside of the predetermined area (A4). The use of a marginal distance is also possible as described earlier.

When a distance from the user's device to the area (A1) is established to be lower than or equal to the predetermined error of the Hybrid device location method—Assisted GPS1, then the device will move to step 3 that provides for greater accuracy. If the device draws further away from the predetermined area (A1) and determines that its distance from the area is greater than that of the predetermined error of the Hybrid device location method without GPS, it will revert back to step 1. The use of a marginal distance is also possible as described earlier. It is also possible to adjust for travel speed of the device towards or away from the predetermined area.

If the device is determined to be static for a time longer than a predetermined period (such as 30 minutes), the program will enter a "dormant mode" in which the GPS based location determination is disabled and the program reawakens. There can be a number of location determination methods by which the device determines it is static, in one embodiment, the location determination means, operating at the accuracy related to the device's location, can determine whether there has been movement of more than x distance (note this amount may be different for each level of distance away from a predetermined area) in y minutes or even seconds. The exact numbers are dependent on the factors described. The device then monitors the devices' position for a location change according to the dormant mode conditions, to determine if the location change is relatively large (which may be dependent on how close the device is to the predetermined area), or as may be determined by other non-GPS location methods. A relatively large location change can be regarded to be one where the program will detect the device changing its position by a distance lower than the distance of the devices' last established position from the predetermined geographical area (A1). Within the dormant mode conditions it is possible for other location determination techniques to be used that consume less battery power than GPS to make a determination but due consideration is made for their associated accuracy of determination in any decision applied by the reawakened program. This applies to all "dormant mode" conditions. The use of a marginal distance is also possible as described earlier. It is also possible to adjust for travel speed of the device towards or away from the predetermined area.

Step 3—Hybrid Device Location Method—Assisted GPS2.

In step 3, the device is located a distance D3 from the predetermined geographical area (A1), in area (A3), such that the device uses the Hybrid device location method—Assisted GPS2 (accuracy up to 30 m, battery drain moderate to heavy) to determine its location with reference to the area (A1). Also, the program determines the device location at a predetermined time interval shorter than in step 2 (i.e. every 5 seconds). The device uses this technique until it reaches a distance to the area at which it cannot be determined with certainty that the device is outside of the predetermined area (A3).

When a distance from the user's device to the area (A1) is established to be lower than or equal to the standard error of the Hybrid device location method—Assisted GPS2, then the device will move to step 4 that provides for greater accuracy. If the device draws further away from the predetermined area (A1) and determines that its distance from the area is greater than that of the standard error of the Hybrid device location method—Assisted GPS1, it will revert back to step 2.

If the device is determined to be static for a time longer than a predetermined period (such as 30 minutes), the program will enter a "dormant mode" in which the GPS based location determination is disabled and the program reawakens. The device then monitors the devices' position for a location change according to the dormant mode conditions, to determine if the location change is relatively large (which may be dependent on how close the device is to the predetermined area), or as may be determined by other non-GPS location methods. A relatively large location change can be regarded to be one where the program will detect the device changing its position by a distance lower than the distance of the devices' last established position from the predetermined geographical area (A1). The use of a marginal distance is also possible as described earlier. It is also possible to adjust for travel speed of the device towards or away from the predetermined area.

Step 4—Hybrid Device Location Method—Assisted GPS3.

In step 4, the user's device is located a distance D2 from the predetermined geographical area (A1), in area A2, such that it can use the Hybrid device location method—Assisted GPS3 (accuracy up to 5 m, battery drain heavy) to determine its location with reference to the area (A1). Also, the program determines the device location at a predetermined time interval less than in step 3 (eg every 1 second). The device will utilize this technique until it enters the predetermined geographic area (A1) associated with a certain action and once entered, the program will execute the associated action. The use of a marginal distance is also possible as described earlier. It is also possible to adjust for travel speed of the device towards or away from the predetermined area.

After the action is executed, the program will examine if the particular predetermined geographic area (A1) is associated with a "time out period". This mechanism allows the programming to ignore a predetermined geographic area (A1) for a period of time as associated with the particular area on a case-by-case basis. If a time out period has been established, then the device will ignore the area for the duration of the timeout period and re-establish its location in respect to the next closest predetermined geographic area (A1') (not shown in FIG. 1) and enter the appropriate step associated with the distance of the device from the next area.

If the device draws further away from the predetermined area (A1) and established that its distance from the area is greater than that of the standard error of the Hybrid device location method—Assisted GPS2, it will revert back to step 3. The use of a marginal distance is also possible as described earlier. It is also possible to adjust for travel speed of the device towards or away from the predetermined area.

Step 5—Entering the Predetermined Geographic Area.

In this step, the user's device has entered the predetermined geographic area (A1). When the device crosses into this area, the program will execute a certain command, action, or communication associated with this area. Similarly, when the device has determined that it has exited the predetermined area (A1), it will revert back to step 4. The device may also communicate that it has left the area.

An example of an application of the method/s disclosed in this specification includes a software application executing on a smart phone which uses geo-fencing to associate the location of the smart phone with a shop location, such that when the smart phone is within an area about the shop, the application will alert the user of the smart phone to the latest specials available to that user if they visit the nearby shop. If the smart phone continuously used prior methods of determining the location of the smart phone, those determinations would cause a continuous drain of energy from the battery of the smart phone which would lessen the usefulness of the smart phone if the battery drain were such that it did not have sufficient energy to supply the smart phone the ability to make and receive telephone or data communications, which is ultimately the primary use of the smart phone. Using the method/s disclosed, the smart phone is ideally using the least battery draining location determination method while still providing adequate location information to the geo-fencing application.

FIGS. 4A, 4B, 4C, 4D, and 4E depict a number of smart phone screen shots illustrating some of the human interfaces of an application which uses the preferred location determination method described herein.

Figure 4A:
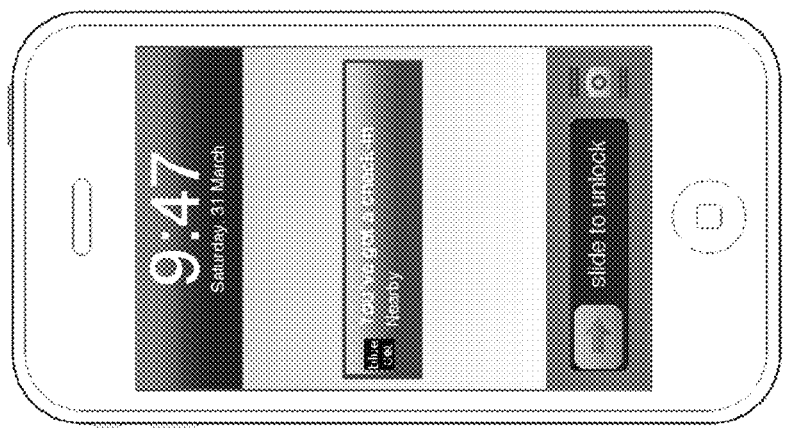
FIGS. 4A, 4B, 4C, 4D and 4E are a collection of user interfaces as observed on the touch screen of a smart phone device, displaying what is seen by a user of the device as the device is about to enter a predetermined area of location as well as other steps in the login process and other functions made available to the user of the device in the case of a smart phone being used.

Notification screen FIG. 4A—This screen represents the notification a user will optional receive on the screen of their smart phone device when their smart phone determines it has entered or is about to enter (depending on the application and user preferences) a predetermined location or area, referred to sometime within this specification as a trigger point. When unlocking their screen which has this notification the respective application will launch straight into the specific trigger point screen associated with the trigger point the smart phone has just entered or is about to enter. The screen notification may optionally be accompanied by an audible alert, also optionally of the users choice.

Figure 4B:
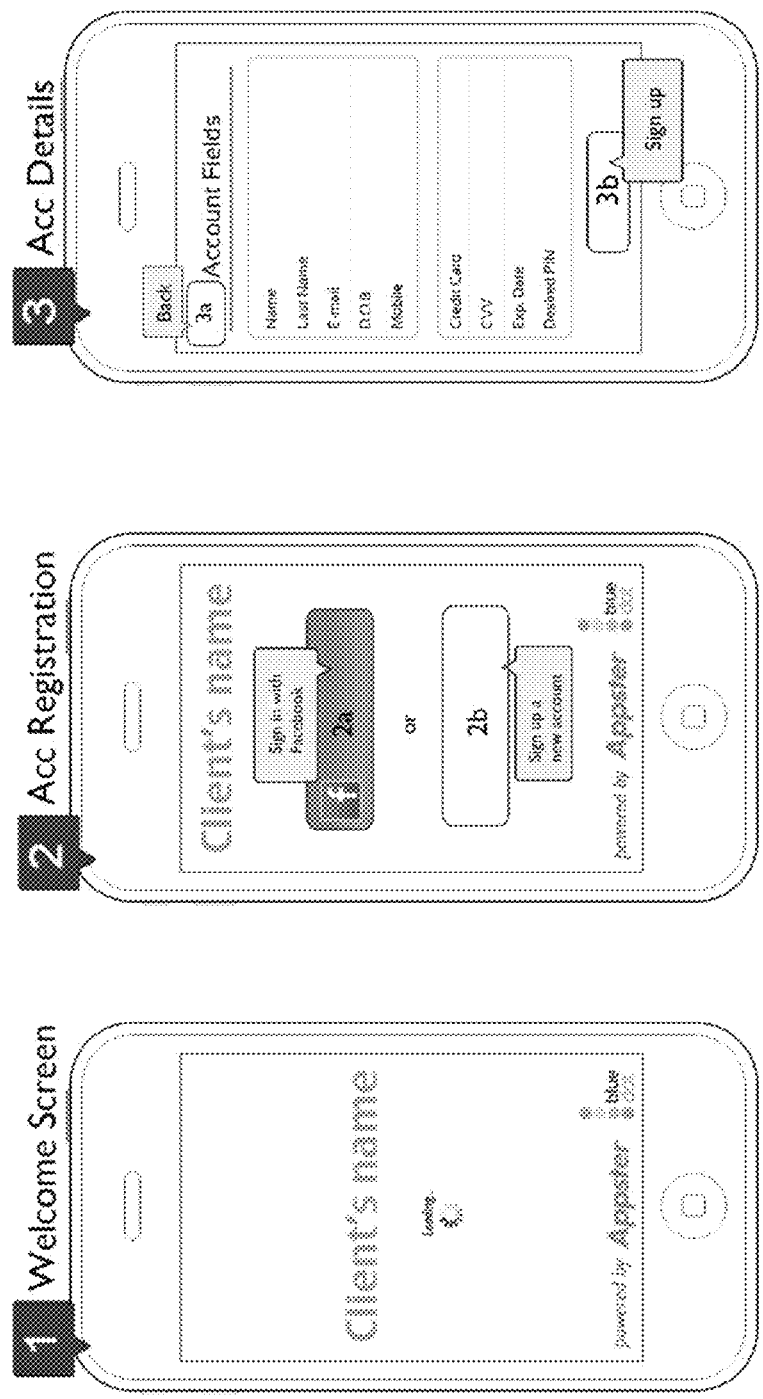

Welcome Screen FIG. 4B—When a user opens up the application for the first time this screen containing branding is displayed for a predetermined period, say few seconds.

Account registration FIG. 4B—When the welcome screen times is displayed the user will be given the option to register via Facebook (other such service provider) or manually.

Account details FIG. 4B—If a user has registered through Facebook, the application will populate some fields within the account details screen, and backend database with user data available from the authorised service provider and the remaining unfilled fields can be entered manually. If Facebook has not been selected, all fields must be entered manually by the user or a user initiated assistance application.

Figure 4C:
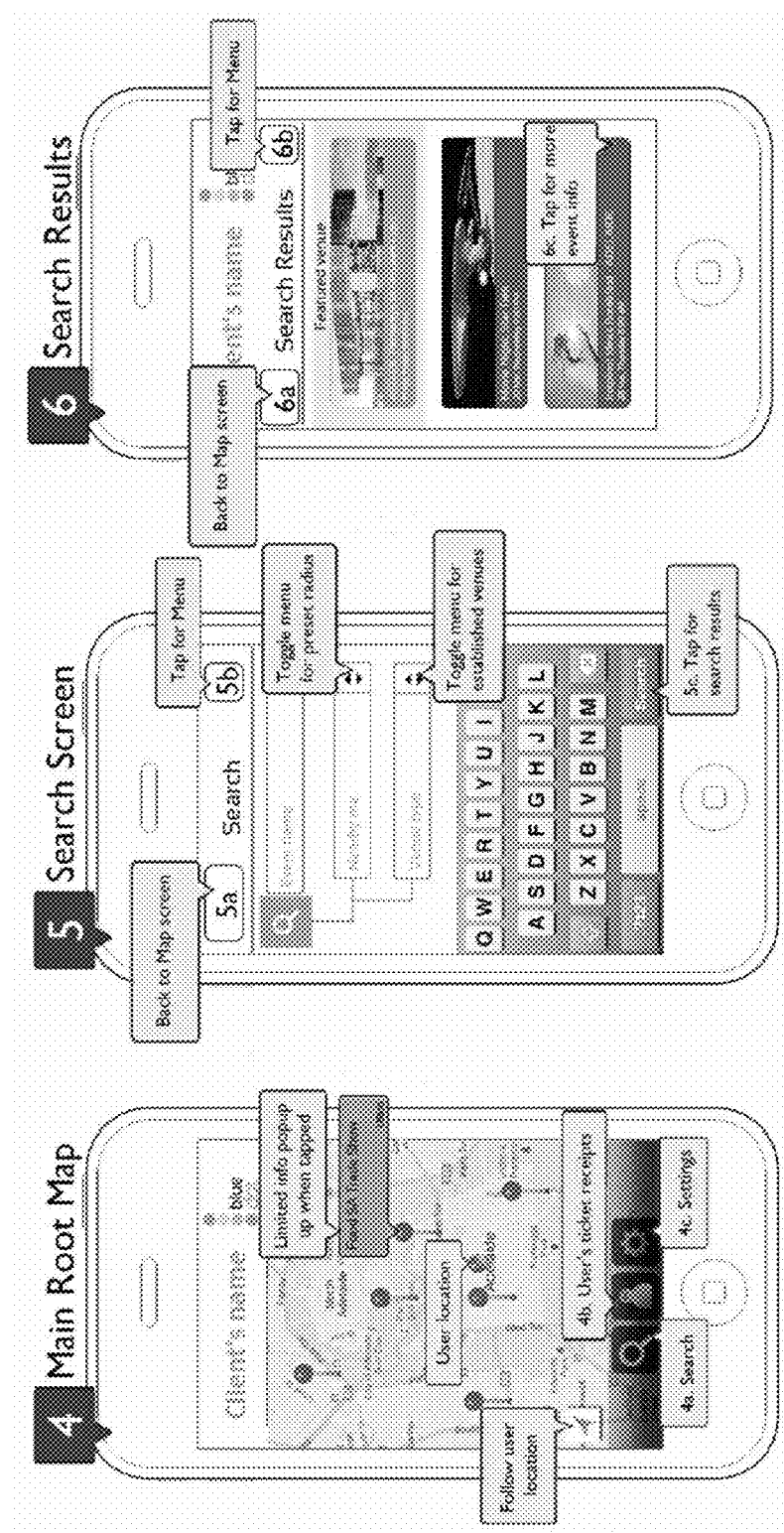

Main Route Map FIG. 4C—The screen will display trigger locations in the vicinity with information about each geofenced location and any trigger actions associated with it or available service provider location or area popping up on screen when tapped by the user, and if tapped twice, the application will go to a screen of information associated with the specific point. The map like interface will display the users' (device) location and the map will be navigable using user initiated interactions, such a dragging, spreading inwards and outwards with the users' fingers or other human interface tools available such as voice, eye movement, etc. this screen may also contain user operable buttons that take the user upon request to the Search, Receipts and Settings Screens Search screen FIG. 4C—This screen will allow the user to search for service providers and their respective geofenced location based on several search parameters such as distance, type of point and services.

Search results FIG. 4C—When the search button is actuated the search results will be displayed with the user being able to manipulate each geofenced location displayed, thus taking them to the page associated with the specific screen of information associated with the geofenced location, as per the Main route Map display.

Figure 4D:
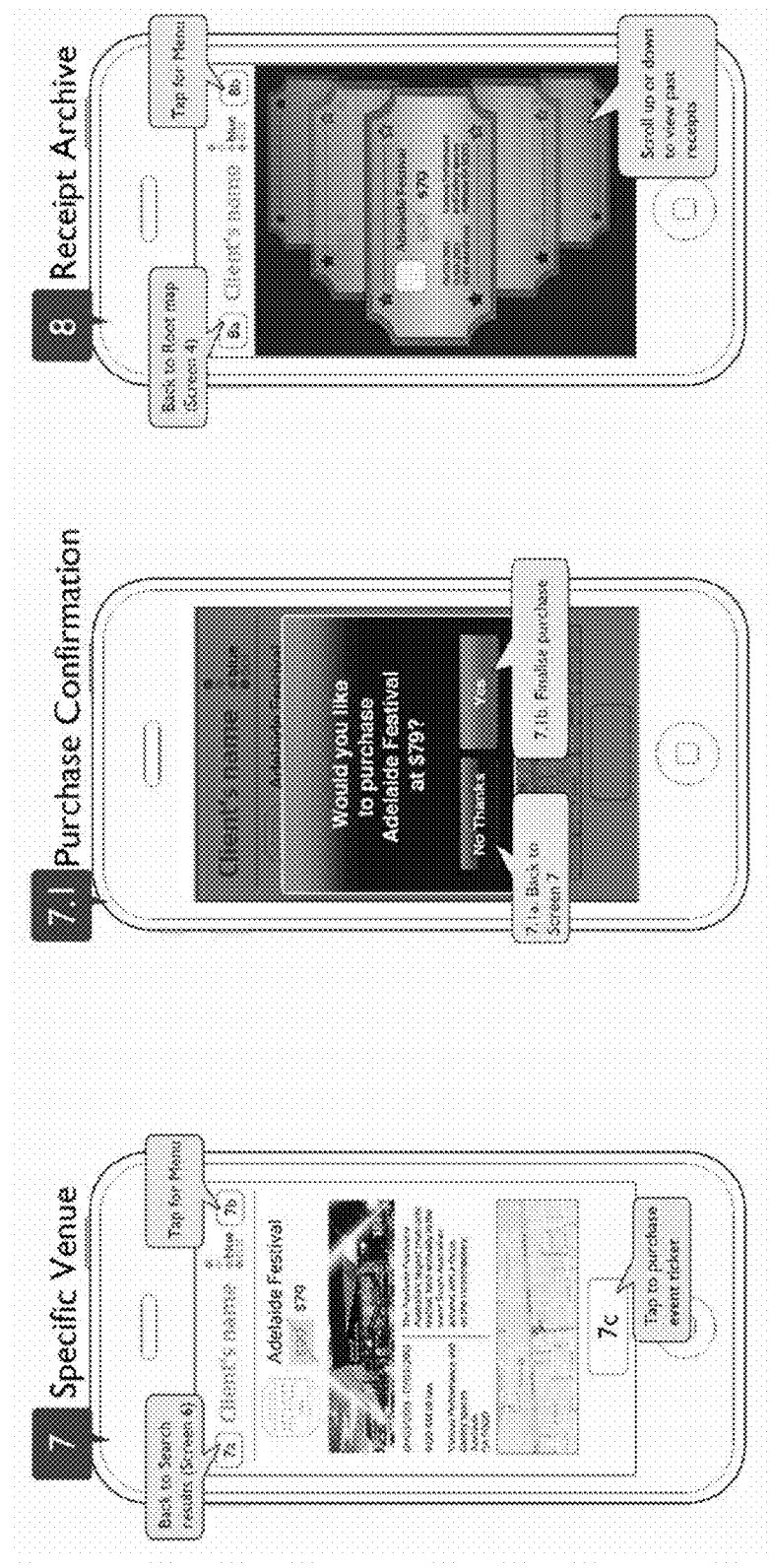

Specific geofenced location Screen FIG. 4D—This screen contains information about the specific geofenced location, including a description and price associated with the location and a map showing the location of the geofenced location (which may be a portion of the main route map described previously). The screen will also contain a user operable button that will allow users to initiate settlement of the payment associated with the specific geofenced location and the associated goods and/or services.

Purchase Confirmation screen FIG. 4D—this screen represents the confirmation request associated with the payment settlement that users must confirm in order to settle the payment.

Trigger log (receipt screen) FIG. 4D—this screen contains a record of all trigger events or transactions that have been processed through the users' account. In some occasions upon clicking on any receipt it will change to show additional details.

Figure 4E:
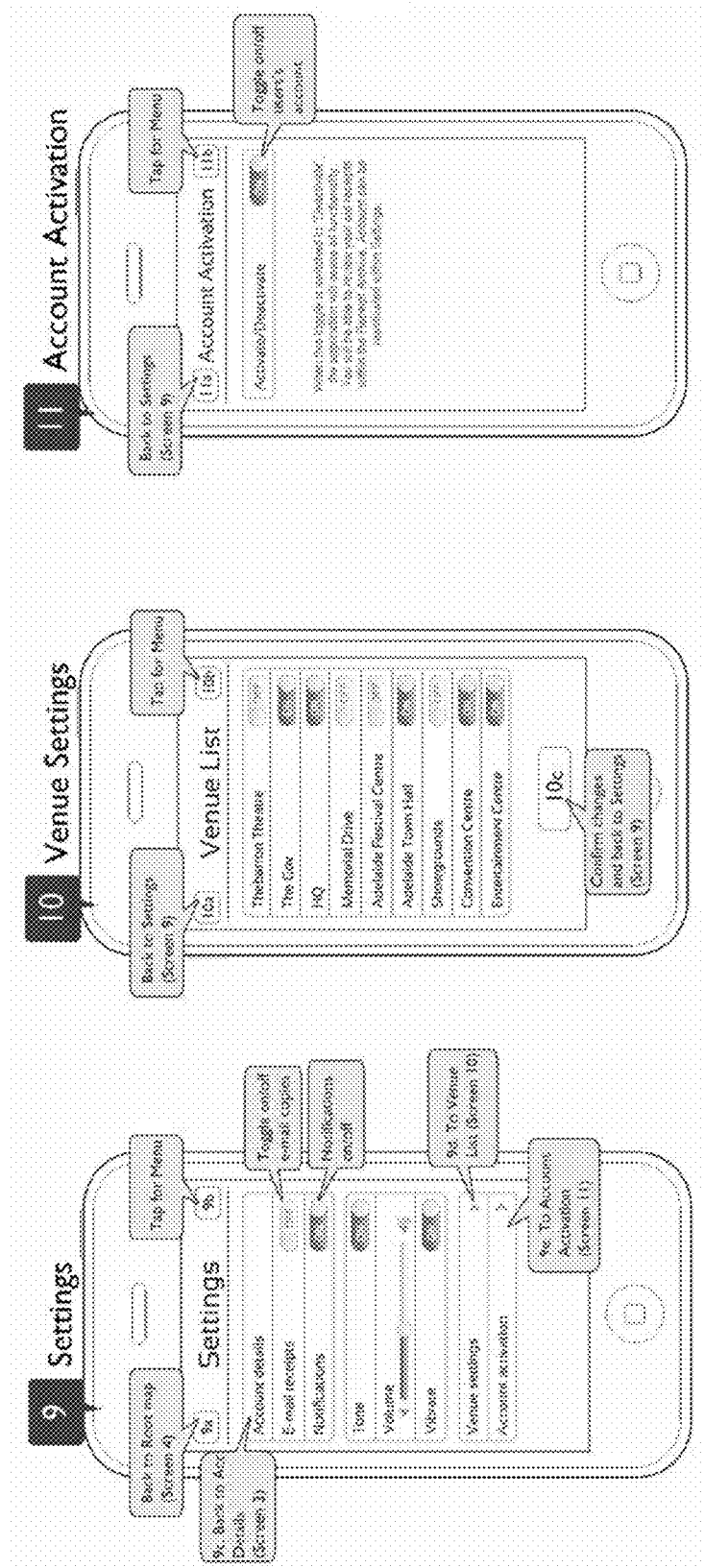

Setting screen FIG. 4E—a screen that a user can use to enter changes to selected aspects of the system functionality such as notification tone and volume.

Trigger list/Venue settings FIG. 4E—a screen that allows a user to allow or disallow trigger alerts and other actions to occur for specific and/or predetermined locations or areas.

Account activation FIG. 4E—A screen that allows a user to deactivate or reactivate their account.

The particular human interface depicted in this specification is merely illustrative as the underlying location determination method used and the savings to battery drain will occur without the user knowing about those process is other than the possible realisation that prior location determination methods made the life of their smart phone battery much shorter than they will be experiencing using the methods described herein.

Figure 5:
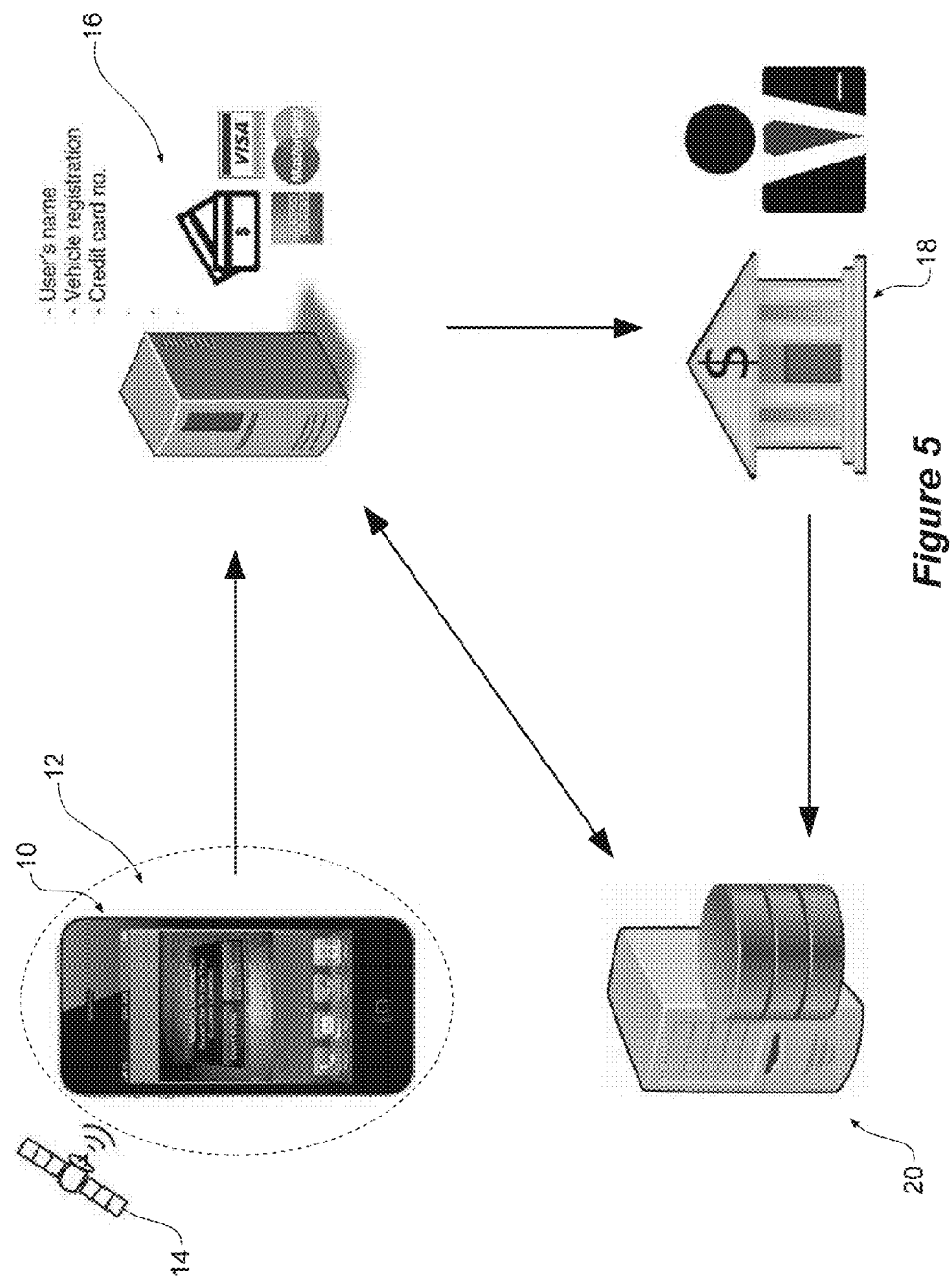
FIG. 5 is an illustrative depiction of the system of devices and servers which support the operation of an application executing on the device.

Any person with control of a suitable device such as, for example, a smart phone can download an application onto their device and once done, as pictorially illustrated in FIG. 5, once the smart phone 10 enters an area 12, there can be an interaction with the user, and there will have been receipt of external sourced location data (eg from GPS satellite/s 14). The smart phone 10 will then interact with central server/s 16 controlled by the application controller/owner, that in turn will interact with third party servers 20 used by suppliers of services eg ticker sellers, entertainment promoters, toll road administrators, etc. and then the respective servers will interact with financial institutions 18 that facilitate the transfer of monies, etc. between the application controller and the third parties.

Figure 6:
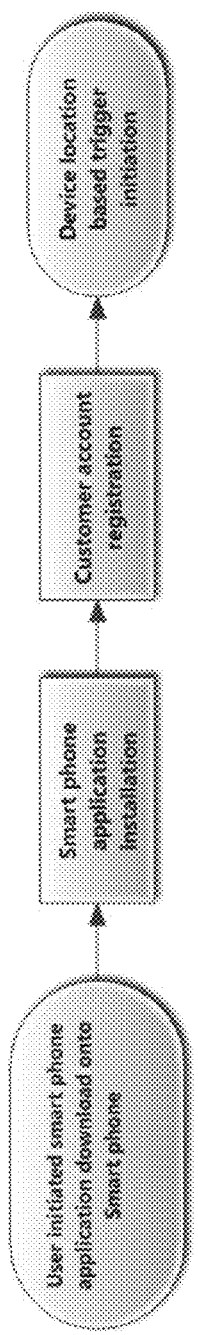
FIG. 6 depicts a flow diagram of the steps associated with application download on to a smart phone device.
Figure 7:
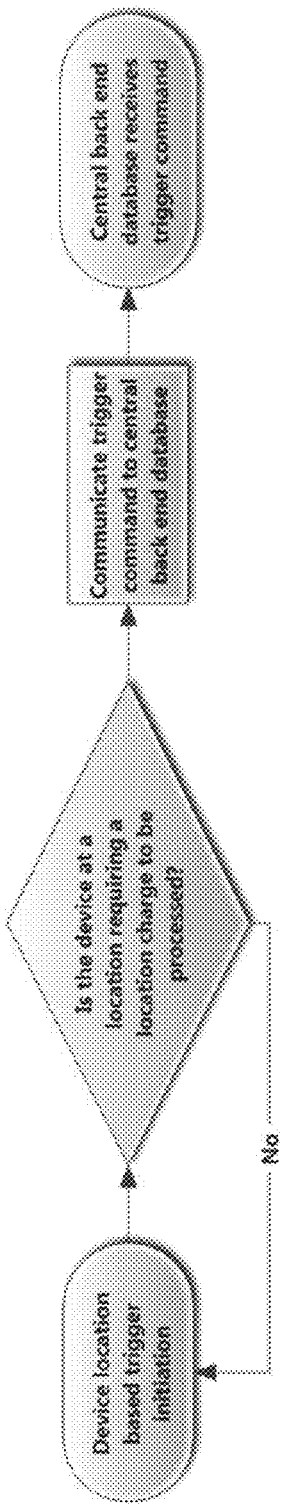
FIG. 7 depicts a flow diagram of the steps associated with device location based trigger for initiating payments for location based charges.

As depicted in FIG. 6, a first step following download of a suitable application is to have the user of the relevant device register their customer details for the service/s provided by the application, including, but not limited to, personal details, vehicle registration and credit/debit card details, thus setting up a permanent customer account. Once this account is set and all details obtained, the application takes on the function of a device location based trigger for initiating payments for location based charges as illustrated in FIG. 7.

Upon entry of required details, the application within the mobile device communicates the required details (encrypted using an encryption algorithm at least meeting PCI DSS 2.0 requirements) to the central data base 16 (FIG. 5) which registers the details and in return, creates a unique alphanumeric account number.

This account number is communicated to the user's device and once this confirmation has been returned to the device, the account number is stored by the application within the mobile device allocated memory while all other details are wiped from the phone creating a precaution against fraud in the event of a security compromise of the individual's smart phone.

Figure 8:
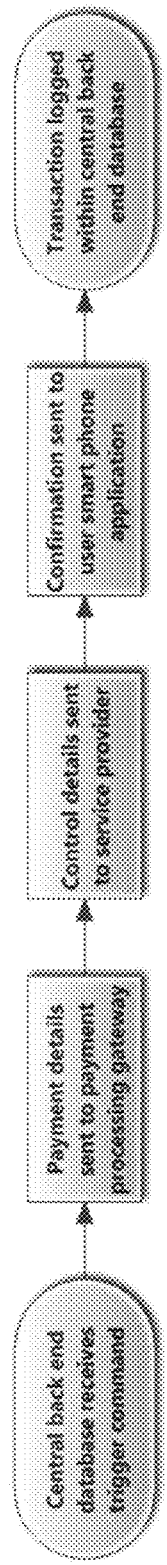
FIG. 8 depicts a flow diagram of the steps associated with communication of account details and device location to the central back end database.

Once the application determines that the individual is in a location requiring a charge to be processed, as a requirement for an individual utilizing services associated with this location (i.e. a toll way entry point or national park entry), it communicates the account details and device location to the central back end database as illustrated in FIG. 8, thus initiating the charging process.

Referring to FIG. 9, the flow diagram provides the steps to be performed by the application to initiate a "passive mode" which allows further battery savings since location determination is ceased under certain conditions, i.e. enters a "dormant mode", refer to FIG. 10, or reactiviates the "active mode" such that the most applicable location determination function is used according to the distance from a predetermined location or area. The use of these preferable modes of operation contribute to the battery savings provided by the embodiments disclosed in this specification.

As depicted in FIG. 9, there are some conditions to be met before entering the "dormant mode", such as: "is there a trigger location within 500 meters?" (where the predetermined distance of 500 meters is only an example, as it could be kilometers); "has significant location change occurred?", the measure of significant being related to, for example, the last known distances from one or more geofenced locations or areas, etc.; "has significant location changed occurred within the last two hours?" (where significant is relative to one or more characteristics, such as actual distance being greater than a predetermined amount, relative to the past history of location change, the last known distance/s from one or more trigger locations or areas, etc.), and, as depicted, all the above conditions need to be satisfied before the application and/or the locations determination functions enter the "dormant mode".

By way of example, the location determination method used during the determinations used in the processes discussed in the previous paragraph are of the type to minimally draw on battery power so their accuracy will not be as great as other determination methods otherwise available, for example, non-GPS location determination method/s.

As disclosed in FIG. 10, once the application and location determination functions are in the "dormant mode", it is possible to return to the "passive mode".

FIG. 10 depicts a flow diagram of the steps associated with being in the dormant mode and possible passive mode reactivation. Those steps include determining that the device has one or at least the following conditions: the position of the device has remained static for a predetermined period of time or determined to be within a predetermined distance for a predetermined period of time. The predetermined distance and time can be set based on a number of criteria, namely, that the time is over a time that a user would expect that the device should be resting and not operational, thus for most users a period of one hour in one place would be enough, or otherwise the distance is less than, say ten meters or at least within the accuracy of the position determination technique being used. The passive mode reactivation includes the possibility that the device has moved or has exceeded a predetermined condition.

What is claimed is:

1. A method for determining a location of a device using a plurality of location determination techniques available to the device, the method comprising:
    determining, by a mobile device, a location of the mobile device using a first location determination technique having a first accuracy of determination;
    determining, by the mobile device, a distance from the determined location to a predetermined location;
    adjusting, by the mobile device, the determined distance by a marginal distance;
    determining, by the mobile device, a travel speed of the mobile device;
    determining, by the mobile device, a first error distance based on the first location determination technique and the travel speed;
    determining, by the mobile device, responsive to the adjusted distance being less than the first error distance, an additional location of the mobile device using a second location determination technique having a second accuracy of determination, the second location determination technique consuming more power of the mobile device than the first location determination technique and the second accuracy of determination greater than the first accuracy of determination; and
    determining, by the mobile device, responsive to the adjusted distance being greater than a third error distance, an additional location of the mobile device using a third location determination technique having a third accuracy of determination, the third location determination technique consuming less power of the mobile device than the first location determination technique and the third accuracy of determination less than the first accuracy of determination.

2. The method of claim 1, wherein location of the mobile device is determined according to a first frequency using the first location determination technique, and the method further comprises:
   determining, responsive to the adjusted distance being less than the first error distance, location of the mobile device according to a second frequency using the second location determination technique, the second frequency greater than the first frequency; and
   determining, responsive to the adjusted distance being greater than the third error distance, location of the mobile device according to a third frequency using the third location determination technique, the third frequency less than the first frequency.

3. The method of claim 1, further comprising:
   determining whether the first location determination technique has been used for a predetermined period of time;
   determining, responsive to the adjusted distance being greater than the third error distance and determining that the first location determination technique has not been used for the predetermined period of time, the additional location of the mobile device using the first location determination technique; and
   determining, responsive to the adjusted distance being greater than the third error distance and determining that the first location determination technique has been used for the predetermined period of time, the additional location of the mobile device using the third location determination technique.

4. The method of claim 1, further comprising:
   increasing the first error distance in response to the travel speed of the mobile device increasing.

5. The method of claim 1, further comprising:
   decreasing the first error distance in response to the travel speed of the mobile device decreasing.

6. The method of claim 1, wherein the first error distance is determined based on whether the mobile device is traveling towards or away from the predetermined location.

7. A method comprising:
   determining, by a mobile device, a location of the mobile device using a first location determination technique having first power drain characteristics and a first accuracy of determination;
   determining, by the mobile device, a distance based on the determined location and a predetermined location;
   determining, by the mobile device, a travel speed of the mobile device;
   determining, by the mobile device, a first error distance based on the first location determination technique and the travel speed; and
   determining, by the mobile device responsive to the determined distance and the first error distance, an additional location of the mobile device using a second location determination technique having second power drain characteristics different than the first power drain characteristics and a second accuracy of determination different than the first accuracy of determination.

8. The method of claim 7, further comprising:
   determining, responsive to the determined distance being less than the first error distance, the additional location of the mobile device using the second location determination technique having the second accuracy of determination, the second location determination technique consuming more power than the first location determination technique and the second accuracy of determination greater than the first accuracy of determination.

9. The method of claim 7, further comprising:
   determining, responsive to the determined distance being greater than a second error distance, the additional location of the mobile device using the second location determination technique, the second location determination technique consuming less power than the first location determination technique and the second accuracy of determination less than the first accuracy of determination of the first location determination technique.

10. The method of claim 7, further comprising:
    adjusting the determined distance by a marginal distance prior to determining an additional location of the mobile device.

11. The method of claim 7, further comprising:
    increasing the first error distance in response to the travel speed of the mobile device increasing.

12. The method of claim 7, further comprising:
    decreasing the first error distance in response to the travel speed of the mobile device decreasing.

13. The method of claim 7, wherein the first error distance is determined based on whether the mobile device is traveling towards or away from the predetermined location.

14. The method of claim 7, wherein a frequency of location determination is determined based on the determined distance.

15. The method of claim 7, further comprising:
    causing the mobile device to enter dormant mode responsive to the mobile device being static for a time longer than a predetermined period.

16. The method of claim 15, wherein one or more location determination techniques are disabled and one or more location determination techniques remain active during dormant mode.

17. The method of claim 7, wherein the location is determined by the mobile device using the first location determination technique and the distance is determined by a server in communication with the mobile device.

18. A non-transitory computer-readable storage medium comprising instructions that when executed by at least one processor cause the processor to perform operations comprising:
   determining a location of a mobile device using a first location determination technique having first power drain characteristics and a first accuracy of determination;
   determining a distance based on the determined location and a predetermined location;
   determining a travel speed of the mobile device;
   determining a first error distance based on the first location determination technique and the travel speed; and
   determining, responsive to the determined distance and the first error distance, an additional location of the mobile device using a second location determination technique having second power drain characteristics different than the first power drain characteristics and a second accuracy of determination different than the first accuracy of determination.

19. The computer-readable storage medium of claim 18, wherein the instructions further cause the processor to perform operations comprising:
   determining, responsive to the determined distance being less than the first error distance, the additional location of the mobile device using the second location determination technique having the second accuracy of determination, the second location determination technique consuming more power than the first location determination technique and the second accuracy of determination greater than the first accuracy of determination.

20. The computer-readable storage medium of claim 18, wherein the location is determined by the mobile device using the first location determination technique and the distance is determined by a server in communication with the mobile device.

* * * * *